United States Patent [19]

Makibayashi et al.

[11] Patent Number: 4,753,421
[45] Date of Patent: Jun. 28, 1988

[54] VIBRATION-PREVENTING RUBBER DEVICE

[75] Inventors: Katsunori Makibayashi, Toyota; Kenji Murase, Suzuka; Motoo Kunihiro, Tsu, all of Japan

[73] Assignees: Toyota Jidosha Kabushiki Kaisha; Toyo Tire & Rubber Co., Ltd., both of Japan

[21] Appl. No.: 881,955

[22] Filed: Jul. 3, 1986

[30] Foreign Application Priority Data

Jul. 5, 1985 [JP] Japan .................................. 60-146580

[51] Int. Cl.$^4$ ............................................. F16F 13/00
[52] U.S. Cl. .................... 267/140.1; 180/300; 180/312; 248/636; 267/219
[58] Field of Search ...................... 267/140.1, 219, 220; 248/562, 636; 180/300, 902, 312

[56] References Cited

U.S. PATENT DOCUMENTS

| | | |
|---|---|---|
| 2,421,585 | 6/1947 | Thiry . |
| 2,540,130 | 2/1951 | Lee . |
| 2,555,347 | 6/1951 | Lee . |
| 2,562,195 | 7/1951 | Lee . |
| 2,600,090 | 6/1952 | Barber et al. . |
| 3,154,273 | 10/1964 | Paulsen . |
| 3,698,703 | 10/1972 | Hipsher . |
| 4,161,304 | 7/1979 | Brenner et al. . |
| 4,377,216 | 3/1983 | Ueno . |
| 4,460,168 | 7/1984 | Obadal . |
| 4,572,488 | 2/1986 | Holmberg, Jr. et al. . |
| 4,573,656 | 3/1986 | Yoshida et al. ................. 267/140.1 |
| 4,611,782 | 9/1986 | Hshijima et al. ............ 267/140.1 X |

FOREIGN PATENT DOCUMENTS

| | | |
|---|---|---|
| 2616258 | 11/1977 | Fed. Rep. of Germany ... 267/140.1 |
| 37348 | 2/1984 | Japan . |
| 231236 | 12/1984 | Japan . |
| 201136 | 10/1985 | Japan .............................. 262/140.1 |
| 1433772 | 4/1976 | United Kingdom . |
| 2041485 | 9/1980 | United Kingdom ............... 267/8 R |

Primary Examiner—George E. A. Halvosa
Attorney, Agent, or Firm—Parkhurst & Oliff

[57] ABSTRACT

This invention relates to a vibration-preventing rubber device in which a partition wall having a hub is positioned outside an inner cylinder and is interposed between an upper plate and a lower plate which are connected to the inner cylinder. An upper vibration-preventing rubber member is interposed between the partition wall and the upper plate and cooperates with the partition wall and the upper plate to define an upper damper liquid chamber. A lower vibration-preventing rubber member is interposed between the partition wall and the lower plate and cooperates with the partition wall and the lower plate to define a lower damper liquid chamber. The upper damper liquid chamber communicates with the lower damper liquid chamber through an orifice. The orifice is formed from a long curved pipe in the shape of a helix or the like.

4 Claims, 1 Drawing Sheet

VIBRATION-PREVENTING RUBBER DEVICE

FIELD OF THE INVENTION

This invention relates to a mounting cushion which is used when a heavy article such as cabin is placed and fixed on, for example, the frame of an automobile.

BACKGROUND OF THE INVENTION

When the body of a cabin or the like is placed and fixed on the frame of an automobile, vibration-preventing devices are interposed between the frame and the body so as to absorb and dampen vibrations. Thus, vibrations transmitted from tires to the frame during operation of the automobile may be prevented from propagating to the body.

In general, vibrations originating during the operation of vehicles have high and medium frequencies. Therefore, vibration-preventing rubber members having comparatively small spring constants are usually used as vibration-preventing devices. Such vibration-preventing devices, however, do not satisfactorily dampen vibrations in a low-frequency region such as, for example, vibrations attributable to undulations of the surface of a bad road.

Multiple mounting type vibration-preventing rubber devices have been developed which do not only absorb high- and medium frequency vibrations but also dampen low-frequency vibrations.

As shown in FIG. 6, a multiple mounting vibration-preventing rubber device 1 includes, for example, an upper plate 2, connected to a lower plate 4, by an inner cylinder 3. A partition wall 6, having a hub 5, fitted outside the inner cylinder 3, is interposed between the upper plate 2 and the lower plate 4.

An upper member of a vibration-preventing rubber member 7, in the shape of a ring, is interposed between the partition wall 6 and the upper plate 2. An upper elastic film 8 is sealingly fixed inside the upper vibration-preventing rubber member 7 such that the lower end thereof is spliced to the hub 5 of the partition wall 6. The upper outer end of the upper elastic film 8 is sandwiched between the upper end of the upper vibration-preventing rubber member 7 and the upper plate 2. The outer end of the upper plate 2 is caulked. This structure defines an upper damper liquid chamber 9.

A lower damper liquid chamber 12 is defined as follows. A lower vibration-preventing rubber member 10, in the shape of a ring, is interposed between the partition wall 6 and the lower plate 4. A lower elastic film 11 is sealingly fixed inside the lower vibration-preventing rubber member 10. The upper end of the lower vibration-preventing rubber member 10 is spliced to the hub 5 of the partition wall 6, and the lower outer end thereof is sandwiched between the lower end of the lower vibration-preventing rubber member 10 and the lower plate 4. The outer end of the lower plate 4 is caulked.

The upper damper liquid chamber 9 and the lower damper liquid chamber 12 communicate through an orifice 13 provided in the partition wall 6. A damper liquid, which is a noncompressible fluid such as coolant, is tightly sealed in the chambers.

Outer peripheral parts of the partition wall 6 of the vibration-preventing device 1 are clamped to the frame 14 of a vehicle by bolts and nuts. The body 15 of, for example, a cabin placed on the upper plate 2, is fixed by a bolt 16, inserted through the inner cylinder 3, and a nut 17. High-frequency and medium-frequency vibrations arising in the frame 14 during operation of the vehicle are absorbed by the vibration-preventing members 7 and 10, while low-frequency vibrations are dampened by flow of the damper liquid through the orifice 13 communicating the damper liquid chambers 9 and 12. Thus, the vibrations from the relative up and down motion of the partition wall 6 and the inner cylinder 3 are attenuated under the damping action of the orifice 13.

The relationship between a frequency corresponding to a peak damping coefficient, namely, the resonance frequency $f_n$ of the damper liquid within the orifice 13, the volume modulus $k_1$ of the upper damper liquid chamber g, the volume modulus $k_2$ of the lower damper liquid chamber 12, the aperture area S of the orifice 13, the length l of the orifice 13, and the specific gravity $\rho$ of the damper liquid, is as follows:

$$f_n \alpha \sqrt{S(k_1 + K_2/\rho l)}$$

That is, the resonance frequency $f_n$ of the damper liquid may be lowered by reducing the aperture area S of the orifice 13, lowering the volume moduli $k_1$ and $k_2$ of the respective damper liquid chambers 9 and 12, or increasing the length of the orifice 13.

In the above vibration-preventing rubber device, when the resonance frequency $f_n$ of the damper liquid within the orifice 13 is lowered to attain satisfactory vibration damping of the components of the relative vertical vibrations of the vehicular frame 14 and the body 15 in the low-frequency region, the aperture area S of the orifice 13 must be reduced. However, when the aperture area S is made smaller than a predetermined value, flow resistance increases thus disadvantageously decreasing the peak value of the damping coefficient which degrades the vibration damping function.

FIG. 3 is a graph showing the correlation between the damping coefficient R of the relative vertical vibrations, shown on the ordinate axis, and the frequency [Hz], shown on the abscissa, with the aperture area S of the orifice 13 being a parameter. The order of values $S_1$, $S_2$ and $S_3$ represent increasing values for the aperture area S. Thus, to enhance the vibration damping function of the vibration-preventing device 1 with a large peak value of the damping coefficient and a low resonance frequency $f_n$, the length l of the orifice 13 needs to be increased while the minimum limit value of the aperture area S thereof remains constant. Since, however, the orifice 13 is a straight pipe, the length of the orifice is limited by the dimensions of the vibration-preventing rubber device 1, so it is difficult to attain a desired damping vibration function.

FIG. 4 is a graph showing the correlation between the damping coefficient R of the relative vertical vibrations, shown on the ordinate axis, and the frequency [Hz], shown on the abscissa, with the length l of the orifice 13 being a parameter. The order $l_1$, $l_2$ and $l_3$ represents increasing lengths l.

SUMMARY OF THE INVENTION

This invention was developed in view of the foregoing background and to overcome the foregoing drawbacks.

It is accordingly an object of the present invention to provide a vibration-preventing rubber device which has improved dynamic characteristics for the components of the relative vertical vibrations of the frame of a vehicle and the body of a cabin or the like in a low-frequency region, so as to enhance riding comfort and to reduce noise. Thus, the present invention contributes to technical field of preventing vibrations in the automotive industry.

These objects are achieved by providing a vibration-preventing device which includes an inner cylinder connected to an upper plate and a lower plate. A partition wall is provided outside of the inner cylinder between the upper plate and lower plate. An upper vibration preventing rubber member and an upper elastic film are provided outside of the inner cylinder between the partition wall and the upper plate. An upper damper liquid chamber is defined by at least the upper vibration-preventing rubber member and the upper elastic film. Preferably, the partition wall also cooperates to define the upper damper liquid chamber.

Similarly, a lower vibration preventing rubber member and a lower elastic film are provided outside of the cylinder between the partition wall and the lower plate. A lower damper liquid chamber is defined at least by the lower elastic film and lower vibration preventing rubber member, and preferably by the partition wall.

An orifice is provided to communicate the upper damper liquid chamber with the lower damper liquid chamber. The orifice has a plurality of curved portions (e.g., it is in a helical or meandering shape) to increase the length of the orifice.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENT

The present invention will be described in detail with reference to the accompanying drawings which illustrate a preferred embodiment according to the present invention.

Figure 1:
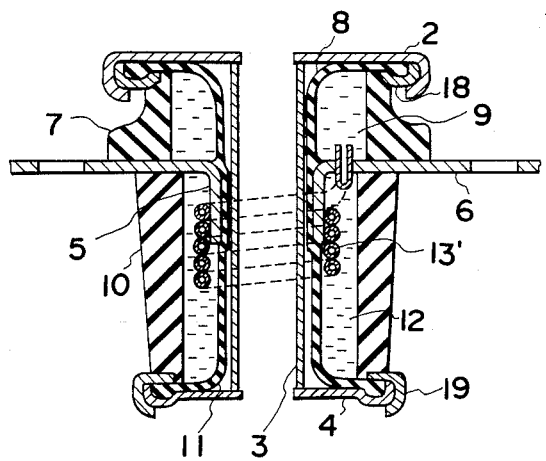
FIG. 1 is a vertical cross-sectional view of one embodiment of a vibration-preventing rubber device according to this invention.

Referring to FIG. 1, symbol 1' denotes a vibration-preventing rubber device according to one embodiment of this invention. This embodiment is used when the cabin of a truck is placed and fixed on the frame of the truck. In the vibration-preventing rubber device 1', an upper plate 2 having an outer end which is substantially L-shaped in vertical cross-section is connected through an inner cylinder 3 to a lower plate 4 having an outer end recess which is substantially U-shaped in vertical cross-section.

A partition wall 6 having a hub 5, which is fitted outside the inner cylinder 3, is interposed between the upper plate 2 and the lower plate 4. An upper vibration-preventing rubber member 7, which is in the shape of a ring and which is provided at its upper end with a fixture 18 substantially U-shaped in vertical cross-section, is interposed between the partition wall 6 and the upper plate 2. Further, an upper elastic film 8 is sealingly fixed inside the upper vibration-preventing rubber member 7. The lower end of the upper elastic film 8 is vulcanized and spliced to the upper part of the hub 5 of the partition wall 6, while the upper outer end thereof is sandwiched between the fixture 18 of the upper vibration-preventing rubber member 7 and the upper plate 2. The L-shaped outer end of the upper plate 2 is caulked.

A lower vibration-preventing rubber member 10, which is in the shape of a ring and which is provided at its lower end with a fixture 19 of inverted-L-shaped vertical cross-section, is interposed between the lower plate 4 and the partition wall 6. Further, a lower elastic film 11 is sealingly fixed inside the lower vibration-preventing rubber member 10. The upper end of the lower elastic film 11 is vulcanized and spliced to the lower part of the hub 5 of the partition wall 6, while the lower outer end thereof is sandwiched between the fixture 19 of the lower vibration-preventing rubber member 10 and the outer end recess of the lower plate 4. The fixture 19 is caulked.

In this embodiment, the upper elastic film 8 and the lower elastic film 11 are connected inside the hub 5 of the partition wall 6 and are integrally formed.

Figure 2:
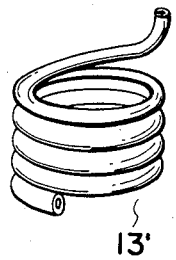
FIG. 2 is a perspective view of an orifice employed in the vibration-preventing device.
Figure 3:
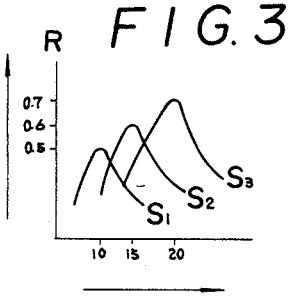
FIGS. 3-5 are graphs showing correlations between the damping coefficient and the frequency.
Figure 6:
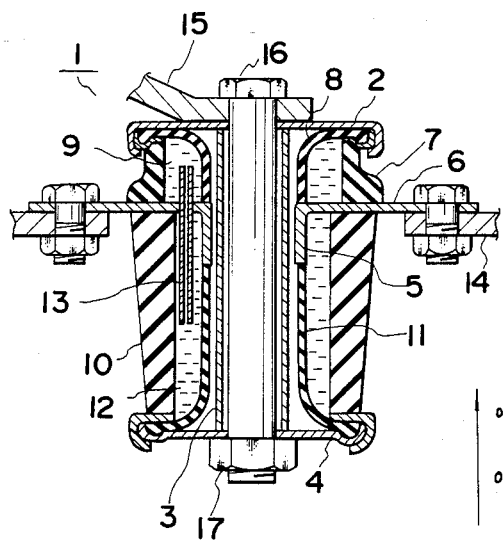
FIG. 6 is a vertical cross-sectional view corresponding to FIG. 1, showing a prior art vibration-preventing rubber device.
Figure 4:
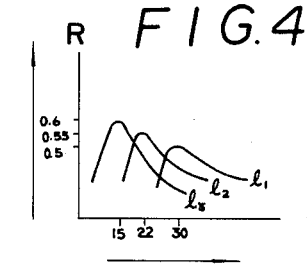

An enclosure 9 is defined by the upper vibrationpreventing rubber member 7, the upper elastic film 8 and the partition wall 6. This enclosure is an upper damper liquid chamber 9. A lower damper liquid chamber 12 is an enclosure defined by the lower vibration-preventing rubber member 10, the lower elastic film 11 and the partition wall 6. Further, an orifice 13', which is in a helical form as shown in FIG. 2, is disposed in the lower damper liquid chamber 12 in such a manner that the upper end thereof penetrates the partition wall 6 and faces the upper damper liquid chamber 9 and that a part thereof is fitted outside the hub 5 of the partition wall 6. The helical shape increases the length of the orifice 13'. The orifice 13' communicates the upper damper liquid chamber 9 and the lower damper liquid chamber 12. A damper liquid such as coolant is tightly sealed in the damper liquid chamber 9 and 12 and is free to flow between these chambers.

The outer peripheral parts of the partition wall 6 of the vibration-preventing rubber device 1' are clamped to a frame 14 by bolts and nuts, and a cabin 15, placed on the upper plate 2, is fixed thereto by a bolt and a nut inserted through the inner cylinder 3.

In the above construction, the upper vibrationpreventing rubber member 7 and the lower vibration-preventing rubber member 10 support a static load applied from above, and they absorb the components of the relative vertical vibrations as well as the relative horizontal vibrations of the frame 14 and the cabin 15 in high-frequency and medium-frequency regions during operation of the vehicle.

In addition, since the orifice 13' is long (due to the helical shape), the peak value of a damping coefficient can be large, and the vibrations in a low-frequency region during the running of the vehicle are satisfactorily dampened, thus enhancing the ride of the vehicle.

Figure 5:
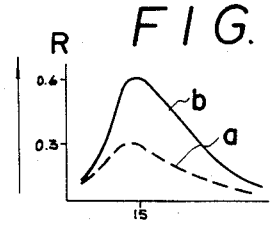

FIG. 5 is a graph showing the correlation between the damping coefficient R, shown on the ordinate axis, and the frequency [Hz], shown on the abscissa. A broken line a corresponds to the prior art vibration-preventing rubber device 1, while a solid line b corresponds to the vibration-preventing rubber device 1' according to this invention. The peak value of the damping coefficient of the vibration-preventing rubber device 1' can be increased about 2 times as compared with the damping coefficient of the prior art vibration-preventing rubber device 1.

Accordingly, in the vibration-preventing rubber device 1, the vibration-preventing rubber members 7 and 10 satisfactorily absorb the high-frequency and medium-frequency vibrations and the damper liquid satisfactorily dampens the low-frequency vibrations. Thus, the vibration transmission factor can be reduced to a small value for vibrations in a wide range of freqeuncies. Therefore, the riding comfort of the car is enhanced and noise inside and outside the car is reduced.

This invention is not restricted to the foregoing embodiment, but various aspects can be adopted. For example, the length of the orifice may be increased by meandering in the vertical direction.

According to the invention described above, a vibration-preventing rubber device can satisfactorily absorb and dampen vibrations in all frequencies (e.g., high-frequency, medium-frequency and low-frequency), thereby enhancing the ride of a vehicle and reducing noise, inside and outside of the vehicle.

More specifically, a partition wall is fitted outside an inner cylinder and interposed between an upper plate and a lower plate which are connected to the inner cylinder, an upper vibration-preventing rubber member is interposed between the partition wall and the upper plate, and a lower vibration-preventing rubber member is interposed between the partition wall and the lower plate. Thus, the components of the relative vertical vibrations and relative horizontal vibrations of the frame of a vehicle and a body in high-frequency and medium-frequency regions are absorbed by the upper vibration-preventing rubber member and the lower vibration-preventing rubber member.

Additionally, an upper damper liquid chamber, formed on the upper side of the partition wall, and a lower damper liquid chamber, formed on the lower side of the partition wall, communicate through an orifice which is formed by a long bent or curved pipe in the shape of a helix or the like, and the peak value of the damping coefficient of the vibration-preventing rubber device can be increased, thereby beneficially permitting the vertical flow of a damper liquid between the upper damper liquid chamber and the lower damper liquid chamber to undergo the damping action of orifices having a large damping coefficient. Thus, the components of the aforementioned relative vertical vibrations in a low-frequency region are dampened.

Accordingly, the vibration-preventing rubber device satisfactorily demonstrates a vibration absorbing function and a vibration damping function for the components of the relative vertical vibrations and relative horizontal vibrations of the frame and the body in the high-frequency, medium-frequency and low-frequency regions, thereby reducing vibration transmission from the frame to the body of a vehicle to enhance the ride of the vehicle.

The device also reduces the vibrations of the body, thereby reducing noise ascribable to these vibrations inside and outside the vehicle.

While the preferred embodiment of the invention has been described, it is to be understood that the invention is not limited thereto, and may be otherwise embodied within the scope of the following claims.

What is claimed is:

1. A vibration-preventing device comprising:
   an inner cylinder;
   an upper plate;
   a lower plate ;
   a partition wall positioned outside said inner cylinder and interposed between said upper plate and said lower plate, said upper plate and said lower plate being connected to said inner cylinder;
   an upper vibration-preventing rubber member interposed between said partition wall and said upper plate;
   an upper damper liquid chamber being defined by said upper vibration-preventing rubber member, said partition wall and said upper plate;
   a lower vibration-preventing rubber member interposed between the partition wall and the lower plate;
   a lower damper liquid chamber being defined between said partition wall, said lower plate and said lower vibration-preventing rubber member;
   a hollow pipe, said upper damper liquid chamber fluidly communicating with said lower damper liquid chamber through said pipe, said pipe comprising a helical portion disposed around said inner cylinder in said lower damper liquid chamber, and a substantially vertical end portion extending through said partition wall between said upper and lower damper liquid chambers.

2. The vibration-preventing device according to claim 1, wherein said helical portion of said pipe is wound along an outer surface of said inner cylinder.

3. The vibration preventing device according to claim 1, further comprising an upper elastic member which cooperates to define said upper damper liquid chamber.

4. The vibration preventing device according to claim 1, further comprising a lower elastic member which cooperates to define said lower damper liquid chamber.

* * * * *